United States Patent
Molinero Fernandez et al.

(10) Patent No.: US 10,044,618 B2
(45) Date of Patent: Aug. 7, 2018

(54) LIMITATION OF SIGNALING MESSAGES TO A POLICY CONTROLLER OF A NETWORK

(75) Inventors: Pablo Molinero Fernandez, Madrid (ES); Reiner Ludwig, Hürtgenwald (DE); Miguel Angel Muñoz de la Torre Alonso, Madrid (ES); Ruth Pallares del Egido, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 177 days.

(21) Appl. No.: 14/391,079

(22) PCT Filed: Apr. 11, 2012

(86) PCT No.: PCT/EP2012/056583
§ 371 (c)(1),
(2), (4) Date: Oct. 7, 2014

(87) PCT Pub. No.: WO2013/152789
PCT Pub. Date: Oct. 17, 2013

(65) Prior Publication Data
US 2015/0081903 A1     Mar. 19, 2015

(51) Int. Cl.
| | |
|---|---|
| G06F 15/173 | (2006.01) |
| H04L 12/801 | (2013.01) |
| H04L 12/813 | (2013.01) |
| H04L 12/26 | (2006.01) |
| H04L 12/24 | (2006.01) |
| H04M 15/00 | (2006.01) |

(52) U.S. Cl.
CPC .......... H04L 47/12 (2013.01); H04L 41/0893 (2013.01); H04L 43/0817 (2013.01); H04L 43/16 (2013.01); H04L 47/20 (2013.01); H04M 15/66 (2013.01)

(58) Field of Classification Search
CPC .................................................. H04L 43/16
USPC ........................................................ 709/225
See application file for complete search history.

(56) References Cited

U.S. PATENT DOCUMENTS

| | | | |
|---|---|---|---|
| 2008/0209023 A1* | 8/2008 | Mazzitelli | H04L 12/2602 709/223 |
| 2009/0141625 A1 | 6/2009 | Ghai et al. | |
| 2013/0286827 A1* | 10/2013 | Zakrzewski | H04L 47/12 370/230 |

FOREIGN PATENT DOCUMENTS

| | | |
|---|---|---|
| EP | 1414195 A2 | 4/2004 |
| EP | 2169551 A1 | 3/2010 |
| WO | 2011020208 A1 | 2/2011 |

OTHER PUBLICATIONS

3GPP, "3rd Generation Partnership Project; Technical Specification Group Core Network and Terminals; Policy and Charging Control (PCC). Reference points (Release 11)", 3GPP TS 29.212 V11.6.0, Sep. 2012, 1-194.

(Continued)

*Primary Examiner* — Kevin Mai
(74) *Attorney, Agent, or Firm* — Murphy, Bilak & Homiller, PLLC

(57) ABSTRACT

A node (36'; 50) generates messages to be sent to a policy controller (30). Further, the node (36'; 50) determines a load value. The load value represents a number of the messages which are sent from the node (36'; 50) to the policy controller in a given time interval. In response to the load value reaching a threshold, the node (36'; 50) limits sending of at least one of the messages to the policy controller.

9 Claims, 7 Drawing Sheets

(56) References Cited

OTHER PUBLICATIONS

3GPP, "3rd Generation Partnership Project; Technical Specification Group Core Network and Terminals; Policy and Charging Control over Rx reference point (Release 11)", 3GPP TS 29.214 V11.4.0, Mar. 2012, 1-50.

3GPP, "3rd Generation Partnership Project; Technical Specification Group Services and System Aspects; Policy and charging control architecture (Release 11)", 3GPP TS 23.203 V11.5.0, Mar. 2012, 1-172.

\* cited by examiner

LIMITATION OF SIGNALING MESSAGES TO A POLICY CONTROLLER OF A NETWORK

TECHNICAL FIELD

The present invention relates to methods of controlling signaling to a policy controller of a network and to corresponding devices.

BACKGROUND

In order to manage usage of network resources, a network may implement policy control mechanisms. For example, 3GPP (Third Generation Partnership Project) mobile networks are provided with a Policy and Charging Control (PCC) architecture. Details of the PCC architecture can be found in 3GPP Technical Specification (TS) 23.203. The PCC architecture allows the operators to achieve real-time control of their network resources, control subscriber access to services, and proactively optimize network capacity. Elements of the PCC architecture include a policy controller, referred to as Policy and Charging Rules Function (PCRF), a Policy Enforcement Function (PCEF) and/or a Bearer Binding and Event Reporting Function (BBERF), an Application Function (AF), and a Traffic Detection Function (TDF).

The PCRF is a policy controller which provides network control regarding service data flow detection, gating, Quality of Service (QoS), and flow based charging. This control involves controlling enforcement of PCC rules by the PCEF and/or controlling enforcement of QoS rules by the BBERF, e.g., by creating PCC rules and installing them in the PCEF, by creating QoS rules and installing them in the BBERF, or by activating or deactivating installed PCC rules or QoS rules.

The AF is an element offering packet-based services or applications that require packet-based transfer of data to or from a user equipment (UE). The PCC architecture allows for subjecting this packet-based transfer of data to dynamic policy and/or charging control. For this purpose, the AF may communicate with the PCRF to transfer information related to the service. The PCRF may use this information for making control decisions.

For example, when the AF needs to transfer data of a service or application to or from the UE, the AF may communicate with the PCRF to request authorization of the service by sending an Authentication/Authorization Request (AAR) command. The PCRF may then authorize the service, create the corresponding PCC/QoS rules and install them in the PCEF or BBERF.

The TDF may support Deep Packet Inspection (DPI), which may be based on classifying data packets, e.g., Internet Protocol (IP) data packets, according to a configured tree of rules so that they are assigned to a particular service.

However, there may be situations in which a node interacting with the PCRF, e.g., an AF, generates a considerable load on the PCRF, e.g., when a large number of services need to be handled. This may result in the PCRF becoming overloaded.

Accordingly, there is a need for techniques which allow for efficiently controlling signaling to a policy controller of a mobile network, fixed network, or converged fixed and mobile network.

SUMMARY

According to an embodiment of the invention, a method of controlling signaling between a node and a policy controller of a network is provided. According to the method, the node generates messages to be sent to the policy controller. Further, the node determines a load value. The load value represents a number of the messages which are sent from the node to the policy controller in a given time interval. In response to the load value reaching a threshold, the node limits sending of at least one of the messages to the policy controller.

According to a further embodiment of the invention, a node is provided. The node comprises an interface for communication with a policy controller of a network and a processor. The processor is configured to generate messages to be sent to the policy controller. Further, the processor is configured to determine a load value. The load value represents a number of the messages which are sent from the node to the policy controller in a given time interval. Further, the processor is configured to limit, in response to the load value reaching a threshold, sending of at least one of the messages to the policy controller.

According to a further embodiment of the invention, a system is provided. The system comprises a policy controller for controlling resources of a network. Further, the system comprises a node connected to the policy controller. The node is configured to generate messages to be sent to the policy controller. Further, the node is configured to determine a load value. The load value represents a number of the messages which are sent from the node to the policy controller in a given time interval. Further, the node is configured to limit, in response to the load value reaching a threshold, sending of at least one of the messages to the policy controller.

DETAILED DESCRIPTION OF EMBODIMENTS

In the following, the invention will be explained in more detail by referring to exemplary embodiments and to the accompanying drawings. The illustrated embodiments relate to concepts of controlling signaling from a node to a policy controller of a network. This node may be part of the network or may be an external node. The policy controller is a node of the network which controls resources of the network, which may be accomplished in accordance with policies or rules configured in the policy controller. In the illustrated examples, the network is a mobile network according to the 3GPP TSs. However, it is to be understood that the network could also be another network, e.g., a fixed network or a converged fixed and mobile network.

Figure 1:
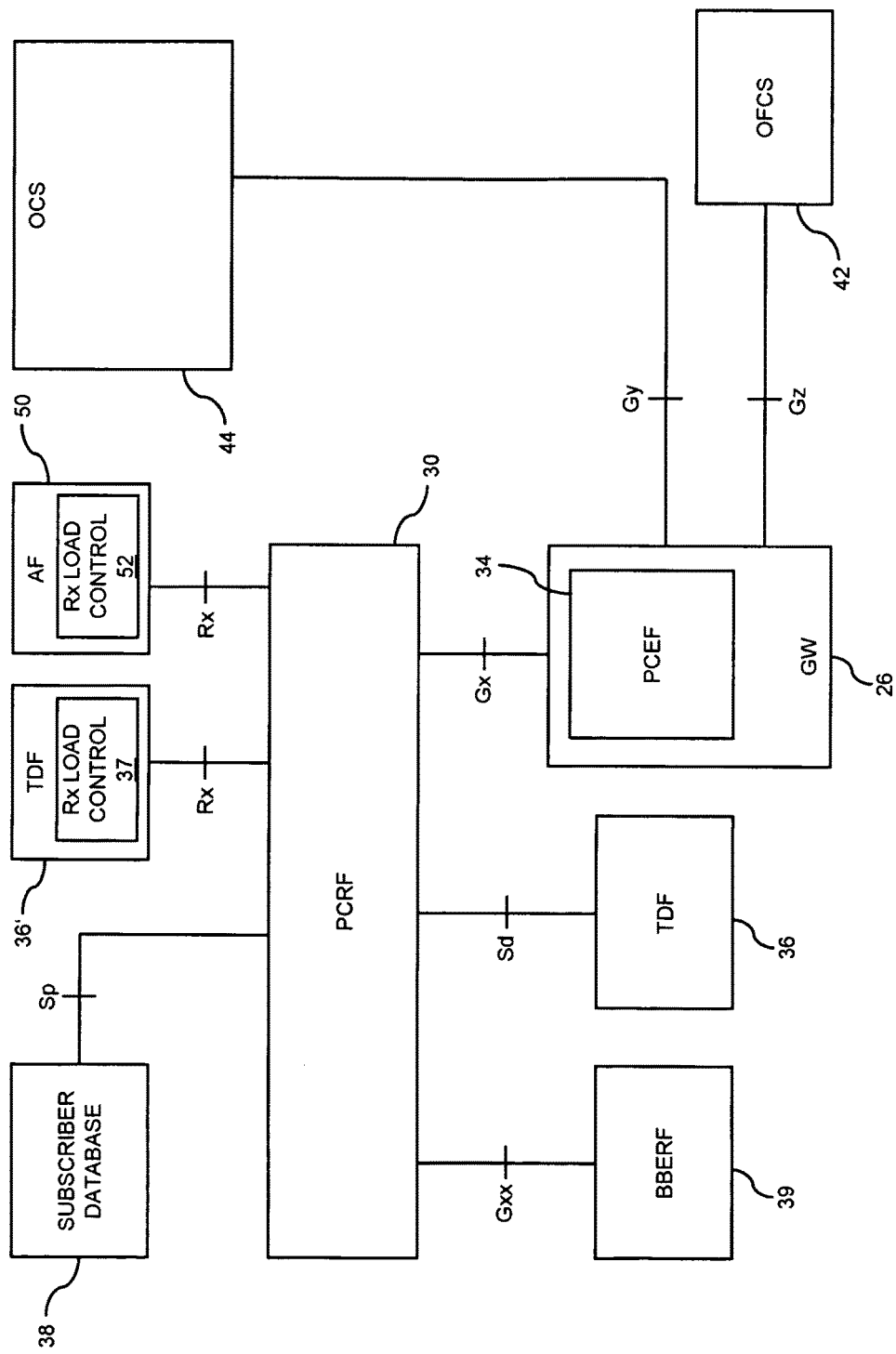
FIG. 1 schematically illustrates a PCC architecture in which concepts of signaling limitation according to an embodiment of the invention are applied.

FIG. 1 schematically illustrates a PCC architecture of the network: The PCC architecture may be implemented in accordance with 3GPP TS 23.203. As illustrated, the PCC architecture includes a gateway (GW) 26, a policy controller in the form of PCRF 30, and a subscriber database 38. Further, the PCC architecture also includes a PCEF 34 which is implemented in the GW 26. In the illustrated example, the subscriber database 38 is assumed to correspond to an SPR (Subscription Profile Repository). However, it is to be understood that other types of subscriber database could be used as well, e.g., a User Data Repository (UDR). As illustrated, the PCC architecture may also include one or more TDF 36, 36', a BBERF 39, an Offline Charging System (OFCS) 42, an Online Charging System (OCS) 44, and the AF 50.

The PCRF 30 may be configured to perform policy control decision and/or flow based charging control. The PCRF 30 may provide network control regarding detection of service data flows, gating, QoS, and flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as DPI, and service classification. In this way data packets may be classified according to PCC rules defined in the PCEF 34 and be assigned to a certain service.

The PCEF 34 may be responsible for enforcing policies with respect to authentication of subscribers, authorization to access and services, accounting, and mobility. The PCRF 30 may be responsible for managing individual policies defining network, application, and subscriber conditions that must be met in order to successfully deliver a service or maintain the QoS of a given service.

The subscriber database 38, which may be a standalone database or integrated into an existing subscriber database such as a Home Subscriber Server (HSS), may include information such as entitlements, rate plans, etc. The subscriber database 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS.

The AF 50 is an element which may be configured to provide one or more packet-based services to a UE connected to the mobile network. These services can be delivered in a network layer which is different from a network layer in which the service was requested. For example, the service can be requested in a signaling layer, e.g., by signaling between the UE and the AF 50, and delivered in the transport layer, e.g., by transferring data packets between the GW 26 and the UE. Examples of AFs are functions of an IP Multimedia Subsystem (IMS) of the mobile network, such as a Proxy Call Session Control Function (P-CSCF), or application servers such as a Session Initiation Protocol (SIP) application server. The AF may also be used to control acceleration or prioritization of content delivery from a content provider. The AF 50 typically communicates with the PCRF 30 to transfer session information, e.g., description of data to be delivered in the transport layer. As mentioned above, this may also involve authorization of a service by the PCRF 30 upon receiving an authorization request from the AF 50.

The TDFs 36, 36' may support packet inspection and service classification, e.g., by performing DPI. For this purpose, data packets, e.g., IP data packets, may be classified according to rules configured in the TDF 36, 36' so that the data packets can be assigned to a certain type of service. The PCRF 30 can then control the provision of appropriate network resources for this service, e.g., by installing or configuring corresponding PCC rules in the PCEF 34. The TDF 36, 36' can be implemented as a standalone node or can be integrated in another network node. In the illustrated PCC architecture, the TDF 36' is assumed to further act as a probe for collecting information on traffic transferred through the mobile network, e.g., by tracking used network resources on the basis of Uniform Resource Locators (URLs) or Uniform Resource Identifiers (URIs) in inspected data packets.

As further illustrated in FIG. 1, the nodes of the PCC architecture are coupled to each other by interfaces or reference points termed as Gx, Gxx, Gy, Gz, Sd, Sp, Sy, and Rx. The Gx reference point resides between the PCRF 30 and the GW 26, and allows for communication between the PCRF 30 and the PCEF 34. The Gxx reference point resides between the PCRF 30 and the BBERF 39. The Gy reference point resides between the GW 26 and the OCS 44. The Gz reference point resides between the GW 26 and the OFCS 42. The Rx reference point resides between the AF 50 and the PCRF 30. Further, the Rx reference point is also used to implement the interface between the TDF 36' and the PCRF 30. Accordingly, the TDF 36' may act as an AF when communicating with the PCRF 30. The Sd reference point resides between the TDF 36 and the PCRF 30. The Sp reference point resides between the subscriber database 38 and the PCRF 30. The Sy reference point resides between the OCS 42 and the PCRF 30. Details concerning the implementation of these interfaces and protocols can be found in the 3GPP TSs, e.g., 3GPP TSs 23.203, 29.212, 29.213, and 29.214. It is to be understood that the PCC architecture of FIG. 1 is intended to show exemplary elements which may be involved in implementation of embodiments of the invention, but that also other elements could be involved in implementation of embodiments of the invention. For example, the PCC architecture of FIG. 1 could be modified with respect to the nodes interfaced to the PCRF 30 and the respective interfaces. For example, the subscriber database 38 could be implemented as a UDR and the interface of the subscriber database 38 to the PCRF 30 could be implemented by the Ud reference point. Also, the PCC architecture could include a V-PCRF (Visited PCRF) to be used for users which are roaming, and the PCRF 30 could be provided with an interface to the V-PCRF, e.g., implemented by the S9 reference point. Moreover, it is to be understood that multiple instances of some nodes may be provided, e.g., multiple GWs and corresponding PCEFs, multiple BBERFs, additional TDFs, or multiple AFs.

For implementing signaling to the PCRF 30, a node connected to the PCRF via the Rx interface, e.g., the AF 50 or the TDF 36', may generate and send various types of messages to the PCRF 30. One type of such messages may be an AAR command, e.g., as specified in 3GPP TS 29.214. An AAR command may initiate a session between the node and the PCRF 30. This type of AAR command may also be referred to as initial AAR command. The AAR command may also be used for conveying information during an ongoing session between the node and the PCRF, e.g., for updating information provided in the initial AAR command. The latter type of AAR command may also be referred to as update AAR command. A further type of such messages may be a Session Termination Request (STR) command, e.g., as specified in 3GPP TS 29.214. The STR command terminates a session between the node and the PCRF 30. Still further types of such messages include a Re-Authorization Answer (RAA) command and an Abort Session Answer (ASA) command. The RAA command and the ASA command may be sent by the node in response to receiving a message from the PCRF 30. In particular, the RAA command may be sent in response to a Re-Authorization Request (RAR) command from the PCRF 30, and the ASA command may be sent in response to an Abort Session Request (ASR) command from the PCRF 30.

Specifically when a large number of different services are handled by the node, this may cause a significant load on the PCRF 30. For example, the TDF 36' may detect a large number of different services in a given time interval. Similarly, also the provision of services by the AF 50 with authorization and resource control by the PCRF 30 may in significant load on the PCRF 30.

Figure 2:
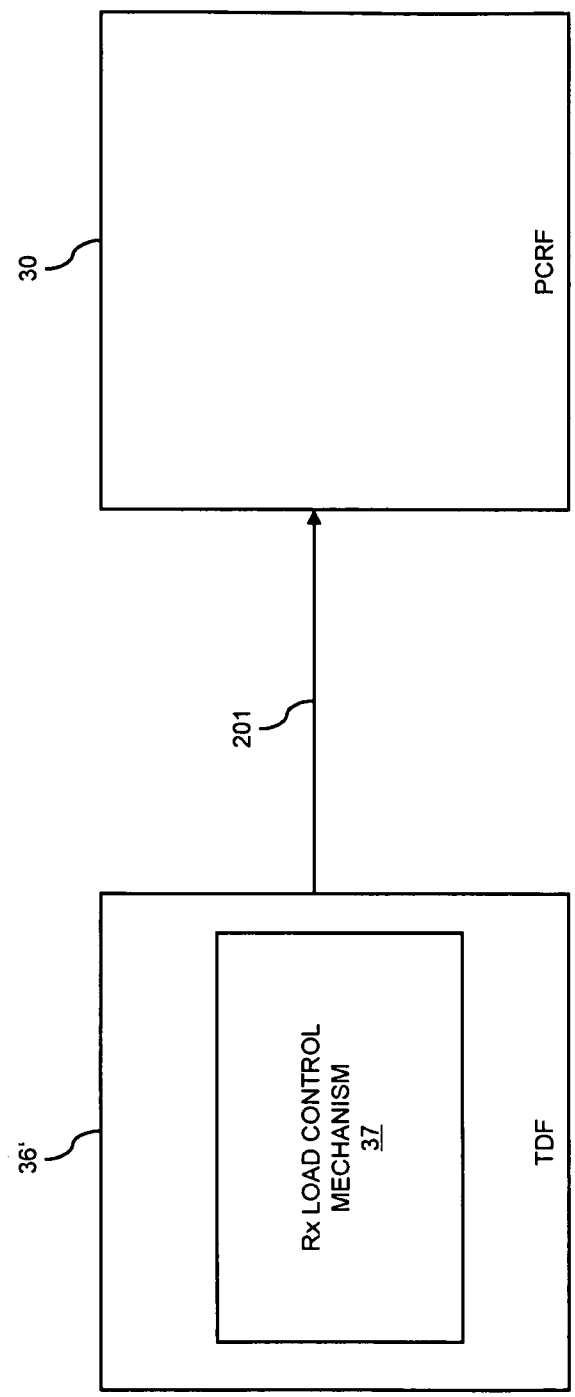
FIG. 2 schematically illustrates a scenario in which the concepts are implemented for signaling between a Traffic Detection Function and the PCRF.
Figure 3:
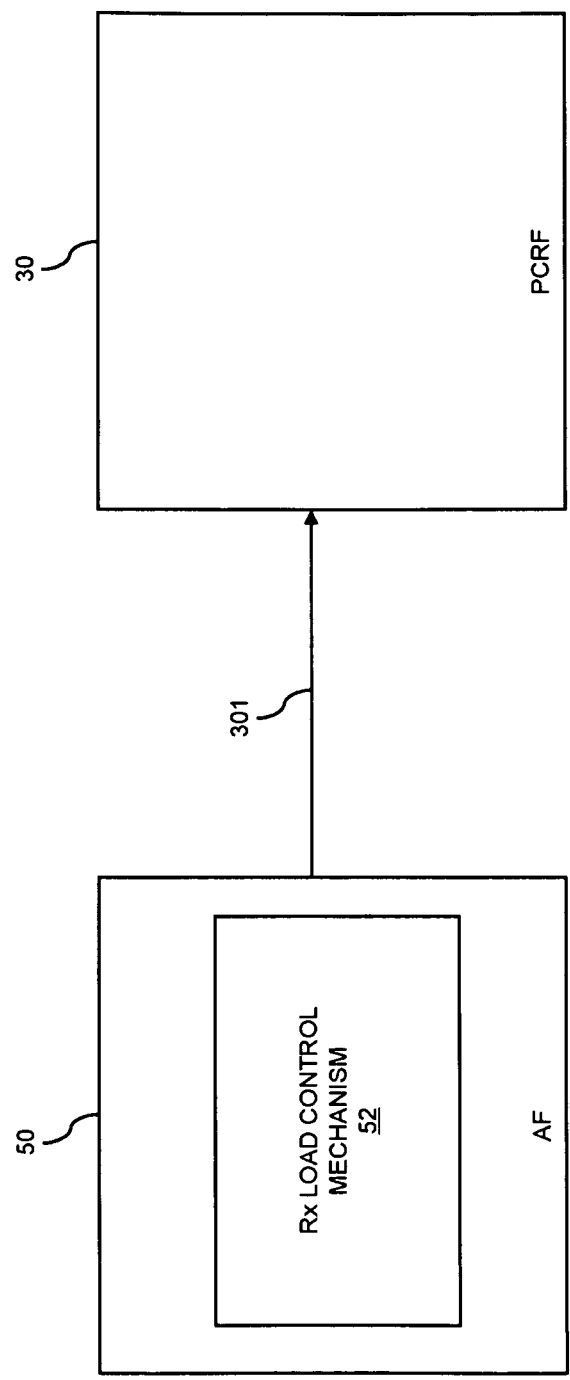
FIG. 3 schematically illustrates a scenario in which the concepts are implemented for signaling between an AF and the PCRF.

In view of this situation, concepts as described herein may implement an Rx load control mechanism 37, 52 in the node. The Rx load control mechanism 37, 52 limits sending of the messages to the PCRF 30. FIG. 2 illustrates the Rx load control mechanism 37 as implemented in the TDF 36', and FIG. 3 illustrates the Rx load control mechanism 52 as implemented in the AF 50. Further, FIG. 2 illustrates the messages 201 which are sent by the TDF 36' to the PCRF 30, and FIG. 3 illustrates the messages 301 which are sent by the AF 50 to the PCRF 30. By means of the load control mechanism, overloading of the PCRF 30 due to an excessive amount of the messages 201, 301 from the node can be avoided. Further, also the traffic which is controlled by the PCRF 30 may benefit from the load control mechanism, e.g., by avoiding an excessive number of services which require resource control by the PCRF 30.

The Rx load control mechanism 37, 52 may operate by determining a load value for a number of the messages which are sent from the node to the PCRF 30 in a given time interval. In response to the load value reaching a threshold, the Rx load control mechanism may limit sending of the messages. In this connection, "reaching the threshold" may include that the load value is equal to or exceeds the threshold. The load value and the threshold may for example be defined in terms of transactions per second. In the node, the threshold may be configured on the basis of a load value which the PCRF 30 can handle without becoming overloaded. The threshold may also be configured on the basis of a load value which keeps the load of the PCRF 30 load in a desired region, e.g., for allowing efficient control of resources and/or high throughput of the controlled traffic. The limitation of sending the messages may for example be implemented by buffering one or more of the messages or by discarding one or more of the messages. The buffered messages may then be sent to the PCRF 30 at a rate which ensures that the threshold for the load value is not exceeded, e.g., by extracting the messages at a suitable rate from the buffer.

As mentioned above, for implementing the Rx load control mechanism the node may determine the load value. This may be accomplished in regular time intervals or with each newly generated message to the PCRF 30. Further, the threshold for this load value is configured in the node. This may for example be accomplished through operations and maintenance (OAM) procedures. Further, the threshold could also be dynamically negotiated between the PCRF 30 and the node. If the node is interacting with multiple PCRFs, i.e., further PCRFs in addition to the PCRF 30, the node may determine the load value individually for each of the PCRFs and a corresponding threshold may be configured for each of the PCRFs. The Rx load control mechanism may then operate in the same way for each of the PCRFs.

When the load value reaches the threshold, one or more of the messages to the PCRF 30 which are subsequently generated by the node are buffered by the node, e.g., in a corresponding message buffer. According to an exemplary implementation, this buffering may be applied to AAR commands and to STR commands. RAA messages or ASA messages may in turn be sent to the PCRF 30 without buffering or other limitation. A corresponding buffer for AAR messages and a corresponding buffer for STR messages can be provided, thereby allowing for efficiently distinguishing between the different types of messages.

In some scenarios, buffering of a message may be performed in a selective manner depending on the type of the message and/or other already buffered messages. For example, before buffering an STR command, it may be checked if the message buffer already includes an AAR command of the same session. If such an AAR command is present and it is the initial AAR command of the session, the STR command may be discarded and the AAR command deleted from the message buffer. If such an AAR command is present but an update AAR command, the STR command may be buffered and the AAR command deleted from the message buffer. If there is no such AAR command in the message buffer, the STR message may be buffered.

By applying the above selective buffering and deleting of buffered messages, the amount of buffered messages and required buffer memory may be reduced. In particular, it can be avoided that STR commands are buffered which belong to a session which is not yet initiated because the initial AAR command is still buffered and not yet sent to the PCRF 30. Further, it can be avoided to initiate a session for which the node already generated an STR command to terminate the session. By reducing the amount of buffered messages also the risk of uncontrolled discarding of messages due to a buffer overflow can be avoided, which is for example undesirable if an STR commands are discarded and the corresponding session in the PCRF 30 is left open.

Messages stored in the message buffer may be removed and sent to the PCRF with an extraction rate which ensures that the load value does not exceed the threshold. This may be accomplished in a first-in/first-out manner, i.e., such that among the buffered messages of a given type, the message which was first stored in the message buffer, i.e., the oldest message, is the first to be sent.

Among messages of different type priorities can be defined. In particular, buffered STR commands can be sent with higher priority to the PCRF 30 than buffered AAR commands. In this way, the load on the PCRF 30, e.g., with respect to memory usage and/or usage of processing resources, can be efficiently reduced by terminating sessions as soon as possible. In some scenarios, the node may always prefer sending a buffered STR command over sending a buffered AAR command. This may have the effect that no AAR commands are sent from the message buffer unless all pending STR commands have been sent from the buffer.

According to some scenarios, if the load value no longer reaches the threshold, newly generated messages may still be buffered in the above-mentioned way while the message buffer still includes buffered messages which have not been sent. Accordingly, the newly generated messages are still buffered until the message buffer is completely empty. In this way, it can be achieved that the buffered messages are sent before the newly generated messages. This avoids situations where a session can unintentionally remain open in the PCRF 30. For example if an STR command would be sent before the initial AAR command of the same session, the STR command would be ignored by the PCRF 30 and the session later initiated by the AAR command would remain open.

Further, if the message buffer reaches a maximum fill level, messages may be deleted from the message buffer. Here, the older messages may be deleted first. Accordingly, if the maximum fill level is reached and a newly generated messaged needs to be buffered, the oldest buffered message may be deleted from the message buffer. By deleting the oldest buffered message, newly generated messages may be prioritized over older messages, which may already be outdated. If the deleted message is an STR command, also the corresponding session between the node and the PCRF 30 is removed, e.g., by deleting context information of the session from the node without notifying the PCRF 30. Alternatively, the message buffer reaching the maximum fill level may also be addressed by leaving the older messages in the message buffer and discarding the newly generated message.

As mentioned above, the node may interact with multiple PCRFs at the same time. In such cases, the Rx load control mechanism could be applied to each of the PCRFs while using individual load values, individual thresholds, and individual message buffers.

In some scenarios, the Rx load control mechanism may also take into account that certain messages may have priority, e.g., if they relate to emergency or government services. Such priority messages may be excluded from the limitation and be sent directly to the PCRF 30. The messages relating to emergency services or other priority services may be identified with a specific service identifier in the message.

Figure 4:
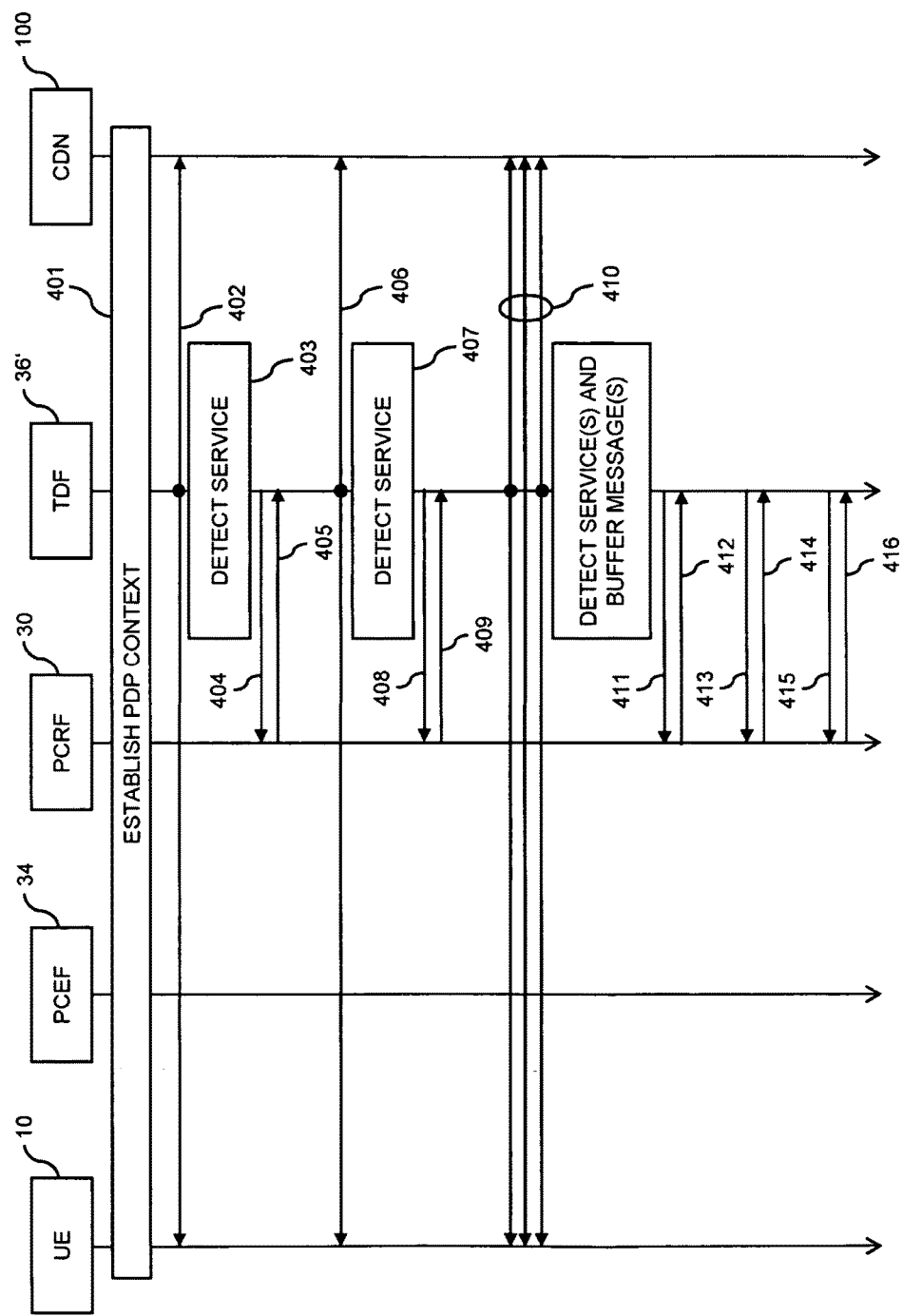
FIG. 4 shows a signaling diagram for schematically illustrating exemplary signaling procedures in accordance with an embodiment of the invention.

FIG. 4 shows a signaling diagram for illustrating exemplary procedures in accordance with the above concepts. The procedures involve a UE 10, the PCEF 34, the PCRF 30, the TDF 36', and a Content Delivery Network (CDN) 100.

In the procedures of FIG. 4 it is assumed that the UE 10 retrieves content from the CDN 100 and the PCC architecture of FIG. 1 is utilized to accelerate or boost content delivery to the UE 10. In this connection, the TDF 36' has the purpose of detecting services involved in the accelerated content delivery from the CDN 100 and of notifying the PCRF 30 accordingly so that the PCRF 30 can control the provision of network resources so as to provide the service with a desired QoS.

At step 401, a Packet Data Protocol context is established for the UE 10. This may involve setting up a packet data connection between the mobile network and the UE 10, e.g., by setting up and configuring one or more bearers between the mobile network and the UE 10. Packet filters in the PCEF 34 and in the UE 10 may be used to direct data packets of a certain service to a bearer offering a desired QoS. Generation and configuration of such packet filters is controlled by the PCRF 30. In the following, it will be assumed that the PDP context established at step 401 at least includes a default bearer offering general packet connectivity to the UE 10.

As illustrated by packet flow 402, the UE 10 may then start communicating data of a first service with the CDN 100. The TDF 36' monitors the traffic of the UE 10, e.g., by performing DPI or other packet inspection techniques.

At step 403, the TDF 36' detects the first service, i.e., identifies that the data packets of the packet flow 402 convey data of the first service. By sending message 404 to the PCRF 30, the TDF 36' informs the PCRF 30 of the detected first service. The message 404 may be an AAR command transmitted over the Rx interface between the TDF 36' and the PCRF 30. The message 404 may also include information describing the packet flow 402, e.g., IP addresses and port numbers of the endpoints in the UE 10 and the CDN 100. Upon receiving the message 404, the PCRF 30 may respond by sending message 405 to the TDF 36'. The message 405 may be an AAA command transmitted over the Rx interface between the PCRF 30 and the TDF 36'.

On the basis of the information included in the message 404, the PCRF 30 may then control the provision of resources for the first service, e.g., by setting up an additional bearer to the UE 10 or by modifying an existing bearer to the UE 10. This can be accomplished by corresponding control signaling to the PCEF 34 (not illustrated in FIG. 4).

In accordance with the above concepts, the message 404 sent by the TDF 36' to the PCRF 30 is taken into account in the determination of the load value. For example, if the load value is determined as a number of sent messages in a given time interval, this number is incremented upon sending the message 404. This time interval can for example be taken into account by decrementing the number on the basis of a regular time schedule, e.g., every second.

As illustrated by packet flow 406, the UE 10 may then start communicating data of a second service with the CDN 100, and the corresponding traffic of the UE 10 is again monitored by the TDF 36', e.g., by performing DPI or other packet inspection techniques.

At step 407, the TDF 36' detects the second service, i.e., identifies that the data packets of the packet flow 406 convey data of the first service. By sending message 408 to the PCRF 30, the TDF 36' informs the PCRF 30 of the detected second service. The message 408 may be an AAR command transmitted over the Rx interface between the TDF 36' and the PCRF 30. The message 408 may also include information describing the packet flow 406, e.g., IP addresses and port numbers of the endpoints in the UE 10 and the CDN 100. Upon receiving the message 408, the PCRF 30 may respond by sending message 409 to the TDF 36'. The message 409 may be an AAA command transmitted over the Rx interface between the PCRF 30 and the TDF 36'.

On the basis of the information included in the message 408, the PCRF 30 may then control the provision of resources for the second service, e.g., by setting up an additional bearer to the UE 10 or by modifying an existing bearer to the UE 10. This can be accomplished by corresponding control signaling to the PCEF 34 (not illustrated in FIG. 4).

The message 408 sent by the TDF 36' to the PCRF 30 is again taken into account in the determination of the load value. In the above example of determining the load value as a number of sent messages in a given time interval, this number further incremented upon sending the message 408.

In the exemplary scenario of FIG. 4, it is assumed that the load value reaches the threshold upon sending the message 408. Accordingly, the above-described limitation of sending messages from the TDF 36' to the PCRF 30 is invoked at this point.

If the UE 10 then starts communicating data of one or more further services with the CDN 100, as illustrated by packet flows 410, the corresponding traffic of the UE 10 will again be monitored by the TDF 36', e.g., by performing DPI or other packet inspection techniques.

However if the TDF 36' detects the further services at step 411, i.e., identifies that the data packets of the packet flows 411 convey data of the further services, the TDF 36' generates messages to inform the PCRF 30 of the detected services, but these messages are not directly sent to the PCRF 30. Rather, the messages are stored in the message buffer at the TDF 36' and sent to the PCRF 30 by extracting them from the message buffer at a rate which ensures that the load value does not further increase beyond the threshold. This controlled sending is illustrated by messages 411, 413, 415. The messages 411, 413, 415 may be AAR commands transmitted over the Rx interface between the TDF 36' and the PCRF 30 and include information describing the respective packet flow 410, e.g., IP addresses and port numbers of the endpoints in the UE 10 and the CDN 100. Upon receiving the messages 411, 413, 415 the PCRF 30 may in each case respond by sending message 412, 414, and 416, respectively, to the TDF 36'. The message 412, 414, 416 may be AAA commands transmitted over the Rx interface between the PCRF 30 and the TDF 36'.

On the basis of the information included in the message 411, 413, 415, the PCRF 30 may then control the provision of resources for the further services, e.g., by setting up additional bearers to the UE 10 or by modifying existing bearers to the UE 10. This can be accomplished by corresponding control signaling to the PCEF 34 (not illustrated in FIG. 4).

The messages 411, 413, 415 sent by the TDF 36' to the PCRF 30 are again taken into account in the determination of the load value. In the above example of determining the load value as a number of sent messages in a given time interval, this number is in each case further incremented upon sending one of the messages 411, 413, and 415.

It is to be understood that the procedures as illustrated in FIG. 4 are merely exemplary. For example, rather than detecting new services as explained above, the TDF 36' could also detect that a previously detected service is no longer used and inform the PCRF 30 accordingly, e.g., by sending an STR command. Also, it is to be understood that the number of illustrated services and associated packet flows is merely exemplary.

Figure 5:
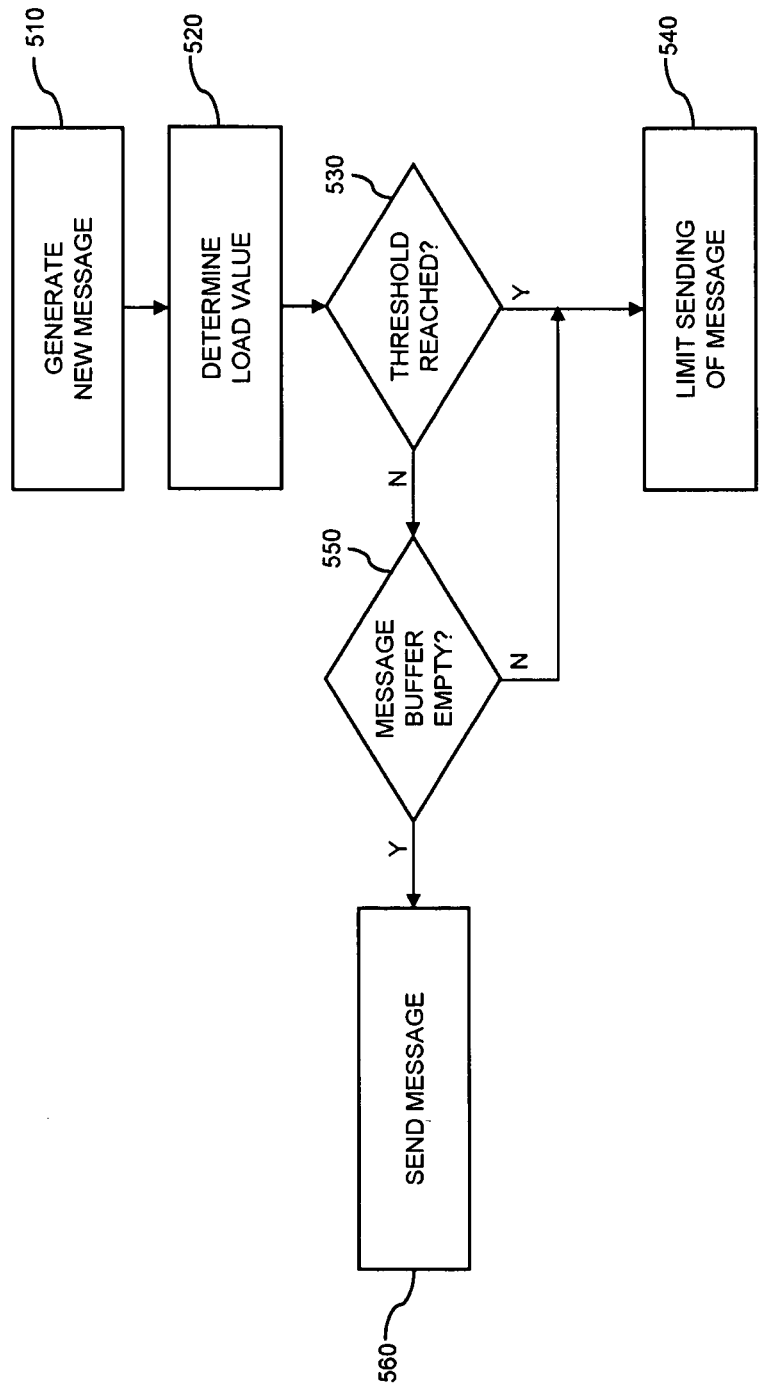
FIG. 5 shows a flowchart for illustrating a method according to an embodiment of the invention.

FIG. 5 shows a flowchart for illustrating a method of controlling signaling to a policy controller. The method may be used for implementing the above-described concepts in a node performing signaling to a policy controller of a network, e.g., in the above-described TDF 36' or in the above-described AF 50. The policy controller may for example correspond to the above-described PCRF 30. The method may also be used for implementing the concepts in a system including the node and the policy controller, e.g., as illustrated in FIG. 2 or 3. The network may be a mobile network, a fixed network, or a converged fixed and mobile network.

In the method, the node generates messages to be sent to the policy controller and determines a load value representing the number of messages which are sent to the policy controller in a given time interval, e.g., as a number or as a rate. The messages may for example include AAR commands, STR commands, RAA commands, and/or ASA commands, e.g., as defined in the Rx protocol of 3GPP TS 29.214. The node may generate the messages in response to monitoring traffic of a UE connected to the network, e.g., of the UE 10. This may for example be the case if the node corresponds to the TDF 36'. The node may also generate the messages for providing information of a service provided by the node. This may for example be the case if the node corresponds to the AF 50.

At step 510, the node generates a new message 510 of the above-mentioned type. The message may for example include an AAR command or and STR command.

At step 520, the node determines the load value. At step 530, the node determines whether the load value has reached a threshold. If this is the case, as indicated by branch "Y" the method continues with step 540. If this is not the case, as indicated by branch "N" the method continues with step 550.

At step 540, the node limits the sending of the message. This may for example include buffering the message. In some cases, this may also include discarding the message. This buffering or discarding of the message may be performed in a selective manner depending on a type of the message and/or a type of a another one of the messages generated by the node. For example, if the messages include a first message and a second message of a session between the node and the policy controller, the node may already have buffered the first message and the new message of step 510 may correspond to the second message.

Then handling of the second message, i.e., whether the second message is buffered or discarded, may depend on the type of the buffered first message and the type of the second message. According to an example, if the first message is an initial AAR command of the session and the second message an STR command of the session, the node may discard the second message and delete the buffered first message. According to a further example, if the first message is an update AAR command of the session and the second message is a STR command of the session, the node may buffer the second message and delete the buffered first message. Further, in response to reaching a maximum fill level of a message buffer for storing buffered messages, the node may delete the oldest buffered message, thereby allowing for buffering the new message without exceeding the maximum fill level.

The node may send the buffered messages from the buffer to the policy controller. This may be accomplished at a rate which ensures that the load value does not exceed the threshold. For example, the load value may be monitored, and if the threshold is no longer reached, the node may extract one of the buffered messages from the message buffer and send it to the policy controller. When sending buffered messages, the node may send older messages first, i.e., control the message buffer according to a first-in/first-out operation.

At step 550, the node may further check whether the message buffer as used for buffering at step 540 is empty, i.e., whether there are still one or more buffered messages which have not yet been sent. If this is the case, as indicated by branch "Y" the method continues with step 560. If this is not the case, as indicated by branch "N" the method continues with step 540, where sending of the message is limited as explained above, e.g., by buffering or discarding. By applying the check of step 550 in connection with the above-mentioned first-in/first-out operation of the message buffer, the node may prioritize sending of buffered messages to the policy controller over sending of newly generated messages to the policy controller.

At step 560 the node sends the message to the policy controller. This can be accomplished without the limitation of step 540.

When sending the messages to the policy controller, the node may prioritize different types of the messages with respect to each other. In particular, if the messages include at least one message of a first type and at least one message of a second type, the node may prioritize sending of the at least one message of the second type over sending of the at least one message of the first type. For example an STR command could be sent with higher priority than an AAR command, i.e., the at least one message of the first type may include an AAR command and the at least one message of the second type an STR command. This prioritization may be specifically applied with respect to buffered messages which are sent to the policy controller.

The method of FIG. 5 may be repeated for each newly generated message.

Figure 6:
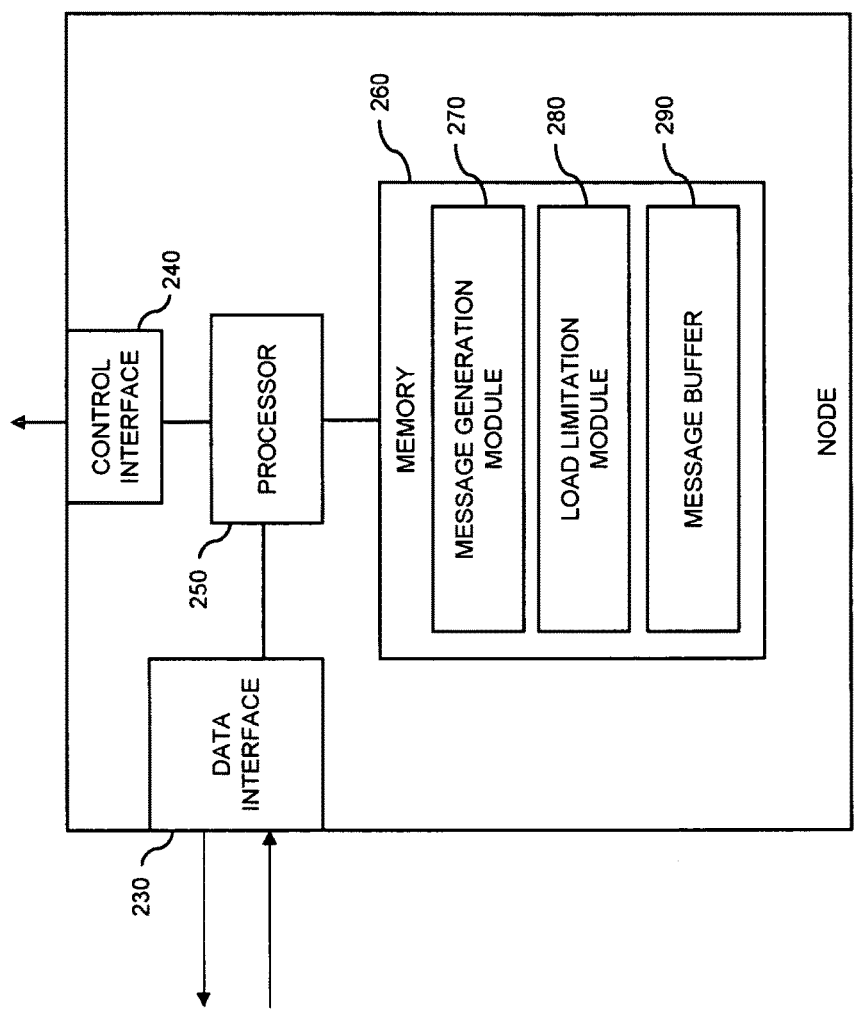
FIG. 6 schematically illustrates a node according to an embodiment of the invention.

FIG. 6 schematically illustrates a node which may be used for implementing the above concepts of limiting signaling to a policy controller. The node may be configured to interact with a PCRF according to the 3GPP TSs, e.g., using the above-mentioned Rx interface. The node may for example correspond to the AF 50 or to another node using the Rx interface to interact with the PCRF, e.g., to the TDF 36'.

In the illustrated example, the node includes a control interface 240 for communication with the policy controller of a communication network, e.g., the PCRF 30. In addition, the node may include a data interface 230, e.g., for receiving and/or sending data traffic of a UE. In the PCC architecture as illustrated in FIG. 1, the control interface 240 may correspond to the Rx interface. The application interface 230 may be generally IP based and may further support various types of service specific or application specific protocols, e.g., the Session Initiation Protocol (SIP). The control interface 240 may for example be used for authorizing a service or for conveying information in relation to a service.

Further, the node includes a processor 250 coupled to the interfaces 240, 230 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities limiting signaling to the policy controller. More specifically, the memory 260 may include a message generation module 270 for generating messages to be sent to the policy controller, e.g., AAR messages or STR messages. Further, the memory 260 may also a load limitation module 280 for performing the above operations for limiting the sending of the generated messages to the policy controller. Further, the memory 260 may include a message buffer 290 in which messages generated by the node may be buffered.

It is to be understood that the structure as illustrated in FIG. 6 is merely schematic and that the node may actually include further components which, for the sake of clarity, have not been illustrated. Also, it is to be understood that the memory 260 may include further types of program code modules, which have not been illustrated, e.g., program code modules for implementing functionalities of certain applications or services or code modules for implementing monitoring of traffic of a UE. According to some embodiments, also a computer program product may be provided for implementing functionalities of the node, e.g., in the form of a medium storing the program code to be stored in the memory 260.

Figure 7:
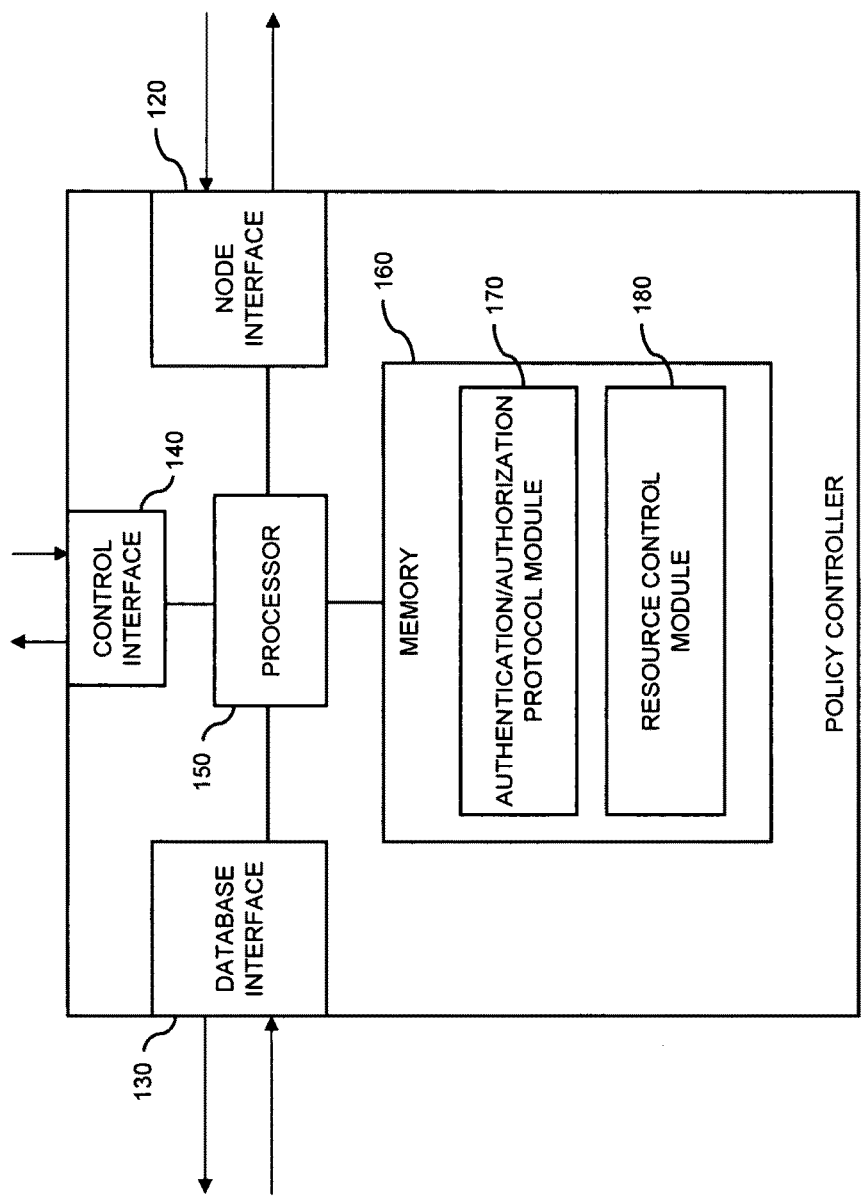
FIG. 7 schematically illustrates a policy controller as used in an embodiment of the invention.

FIG. 7 schematically illustrates a policy controller which may be used in the above concepts of controlling signaling to a policy controller. The policy controller may correspond to the PCRF 30. In this case, the signaling authorization of the service may involve interaction between the policy controller 30 and a node via the Rx interface.

In the illustrated example, the policy controller includes a node interface 120 for communication with one or more nodes, e.g., the AF 50 or the TDF 36'. In addition, the policy controller may include a control interface 140, e.g., for controlling resources for conveying data. In a 3GPP PCC architecture as illustrated in FIG. 1, the node interface 120 may correspond to the Rx interface, and the control interface 140 may correspond to the Gx interface and/or to the Gxx interface. The node interface 120 may for example be used for receiving the above-mentioned messages from a node. The control interface 140 may then be used for controlling resources for conveying data of a service session. As further illustrated, the policy controller may also include a database interface 130 for interacting with a subscriber database, e.g., the subscriber database 38 of FIG. 1.

Further, the policy controller includes a processor 150 coupled to the interfaces 120, 130, 140 and a memory 160 coupled to the processor 150. The memory 160 may include a ROM, e.g., a flash ROM, a RAM, e.g., a DRAM or SRAM, a mass storage, e.g., a hard disk or solid state disk, or the like. The memory 160 includes suitably configured program code to be executed by the processor 150 so as to implement the functionalities of the policy controller as described in connection with FIGS. 1 to 4. More specifically, the memory 160 may include an authorization/authentication protocol module 170 so as to enable handling of the above-mentioned messages from the node. Further, the memory 160 may also include a resource control module 180 so as to implement the above-described functionalities of controlling resources of the network depending on the messages received from the node, which may be accomplished according to policies and rules configured in the policy controller and may consider inputs from various nodes, e.g., as illustrated in FIG. 1.

It is to be understood that the structure as illustrated in FIG. 7 is merely schematic and that the policy controller 30 may actually include further components which, for the sake of clarity, have not been illustrated. Also, it is to be understood that the memory 160 may include further types of program code modules, which have not been illustrated, e.g., program code modules for implementing known functionalities of a PCRF according to the 3GPP TSs. According to some embodiments, also a computer program product may be provided for implementing functionalities of the node, e.g., in the form of a medium storing the program code to be stored in the memory 160.

As can be seen, the concepts as explained above allow for efficiently avoiding that a policy controller of a network, e.g., a PCRF, is overloaded by Rx messages from nodes such as an AF or TDF.

It is to be understood that the examples and embodiments as explained above are merely illustrative and susceptible to various modifications. For example, the concepts could be used in other types of networks, e.g., using other types of policy controller than the above-mentioned PCRF. Depending on the type of policy controller, also other types of interfaces than the above-mentioned Rx interface may be used, e.g., other interfaces on the basis of the Diameter protocol according to the RFC 3588 standard. Also, it is to be understood that the illustrated and described nodes, e.g., AF 50, TDF 36' or PCRF 30, may each be implemented by a single device or by multiple devices, e.g., a cloud of interconnected devices or server farm. Further, it is to be understood that the above concepts may be implemented by using correspondingly designed software in existing network devices, or by using dedicated network device hardware.

The invention claimed is:

1. A method of controlling signaling between a node and a policy controller of a network, the method comprising:

the node generating messages to be sent to the policy controller;

the node determining a load value representing a number of the messages that are sent from the node to the policy controller in a given time interval; and in response to the load value reaching a threshold, the node limiting sending of at least one of the messages to the policy controller, wherein the messages comprise a first message and a second message of a session between the node and the policy controller, wherein the limiting sending comprises buffering the first message and selectively buffering or discarding the second message, depending on a type of the buffered first message and a type of the second message, and wherein selectively buffering or discarding the second message comprises:

in response to determining that the first message is an initial authentication/authorization request command of the session and the second message is a session termination request command of the session, the node discarding the second message and deleting the buffered first message; and in response to determining that the first message is an update authentication/authorization request command of the session and the second message is a session termination request command of the session, the node buffering the second message and deleting the buffered first message.

2. The method of claim 1, wherein the node prioritizes sending of a session termination request command over sending of an initial or update authentication/authorization request command.

3. The method of claim 1, comprising, in response to determining that the load value no longer reaches the threshold, the node prioritizing sending of buffered messages to the policy controller over sending of newly generated messages to the policy controller.

4. The method of claim 1, comprising, in response to reaching a maximum fill level of a message buffer for storing buffered messages, the node deleting the oldest buffered message.

5. The method of claim 1, wherein the node generates the messages in response to monitoring traffic of a user equipment connected to the mobile network.

6. The method of claim 1, wherein the node generates the messages for providing information of a service provided by the node.

7. A node, comprising:

an interface for communication with a policy controller of a network, and a processor, wherein the processor is configured to:

generate messages to be sent to the policy controller, determine a load value representing a number of the messages that are sent from the node to the policy controller in a given time interval, and in response to the load value reaching a threshold, limit sending of at least one of the messages to the policy controller, wherein the messages comprise a first message and a second message of a session between the node and the policy controller, wherein the processor is configured to limit sending by buffering the first message and selectively buffering or discarding the second message, depending on a type of the buffered first message and a type of the second message, and wherein the processor is configured to selectively buffer or discard the second message by:

in response to determining that the first message is an initial authentication/authorization request command of the session and the second message is a session termination request command of the session, the node discarding the second message and deleting the buffered first message; and in response to determining that the first message is an update authentication/authorization request command of the session and the second message is a session termination request command of the session, the node buffering the second message and deleting the buffered first message.

8. The node of claim 7, further comprising a message buffer for buffering at least one of the first and second messages.

9. A system, comprising:

a policy controller for controlling resources of a network, and a node connected to the policy controller, wherein the node comprises processing circuitry configured to:

generate messages to be sent to the policy controller, determine a load value representing a number of the messages that are sent from the node to the policy controller in a given time interval, and in response to the load value reaching a threshold, limit sending of at least one of the messages to the policy controller, wherein the messages comprise a first message and a second message of a session between the node and the policy controller, wherein the processing circuitry is configured to limit sending by buffering the first message and selectively buffering or discarding the second message, depending on a type of the buffered first message and a type of the second message, and wherein the processing circuitry is configured to selectively buffer or discard the second message by:

in response to determining that the first message is an initial authentication/authorization request command of the session and the second message is a session termination request command of the session, the node discarding the second message and deleting the buffered first message; and in response to determining that the first message is an update authentication/authorization request command of the session and the second message is a session termination request command of the session, the node buffering the second message and deleting the buffered first message.

* * * * *